United States Patent [19]

Hutchinson

[11] 4,363,371
[45] Dec. 14, 1982

[54] PEDIATRIC TRAY AND WEIGHING SCALE

[75] Inventor: William Y. Hutchinson, Chicago, Ill.

[73] Assignee: Continental Scale Corporation, Bridgeview, Ill.

[21] Appl. No.: 231,743

[22] Filed: Feb. 5, 1981

[51] Int. Cl.³ ............................................. G01G 21/22
[52] U.S. Cl. ................................... 177/262; D10/91
[58] Field of Search .......................... 177/262; D10/91

[56] References Cited
U.S. PATENT DOCUMENTS

D.245,675  9/1977  Kushmuk ........................... D10/91
3,279,549 10/1966  Feinberg et al. ................. 177/262 X Primary Examiner—George H. Miller, Jr.
Attorney, Agent, or Firm—Richard L. Johnston

[57] ABSTRACT

A tray in combination with a weighing scale is provided wherein the tray is elongated and the support for the weighing platform of the weighing scale is adapted to rest on a flat, horizontal surface, the tray having a skirt extending downwardly at least partially around the weighing platform and terminating a fraction of an inch from the flat, horizontal surface on which the scale rests, whereby elongated and sometimes squirming objects such as babies can be weighed without tipping or over-turning the tray.

12 Claims, 5 Drawing Figures

PEDIATRIC TRAY AND WEIGHING SCALE

BACKGROUND

In ordinary weighing scales of the type used in weighing babies, it is conventional to have a tray which sits on the weighing platform of the scale and which is adapted to receive the baby or other object to be weighed. A conventional sized tray with deep sides and with the ends extending only slightly over the edge of the weighing platform is satisfactory so long as the baby or other object is relatively small and more or less immobile. However, scales of this type employed for weighing babies have limited utility as the child grows and becomes more active. In the usual case the tray for receiving the baby soon becomes too small and if the elongation of the tray were increased, it would become top heavy and tend to tip in the direction of the elongation.

Accordingly, there is a need for an improved weighing scale in which the tray can be increased in length as compared with a tray in a conventional scale but at the same time is relatively stable and does not tend to tip or turn over when used for weighing active babies and older babies which have increased in size and weight but are still small enough to be weighed by placing them horizontally in a tray which in turn is mounted on a weighing platform of a weighing scale.

BRIEF SUMMARY OF THE INVENTION

A tray in combination with a weighing scale is provided wherein the tray is elongated and the support for the weighing platform of the weighing scale is adapted to rest on a flat, horizontal surface, the tray having a skirt extending downwardly at least partially around the weighing platform and terminating a fraction of an inch from the flat, horizontal surface on which the scale rests, whereby elongated and sometimes squirming objects such as babies can be weighed without tipping or over-turning the tray.

DETAILED DESCRIPTION OF THE INVENTION

The best mode contemplated for the practice of the invention is illustrated in the accompanying drawing in which FIG. 1 is a front elevational view of a weighing scale containing an elongated tray to receive an object to be weighed which tray is provided with a skirt as hereinafter more fully described;

Figure 3:
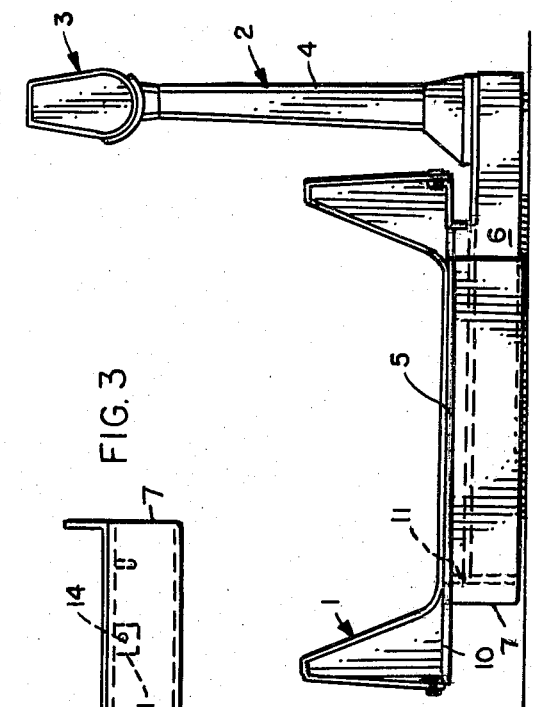
FIG. 3 is a side view of the tray and scale shown in FIGS. 1 and 2.
Figure 2:
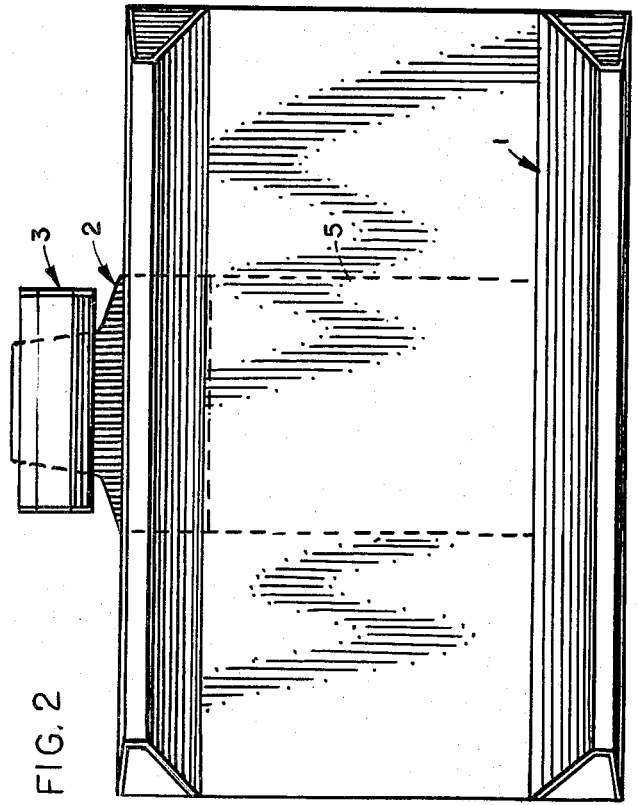
FIG. 2 is a plan view of the tray and scale shown in FIG. 1.
Figure 1:
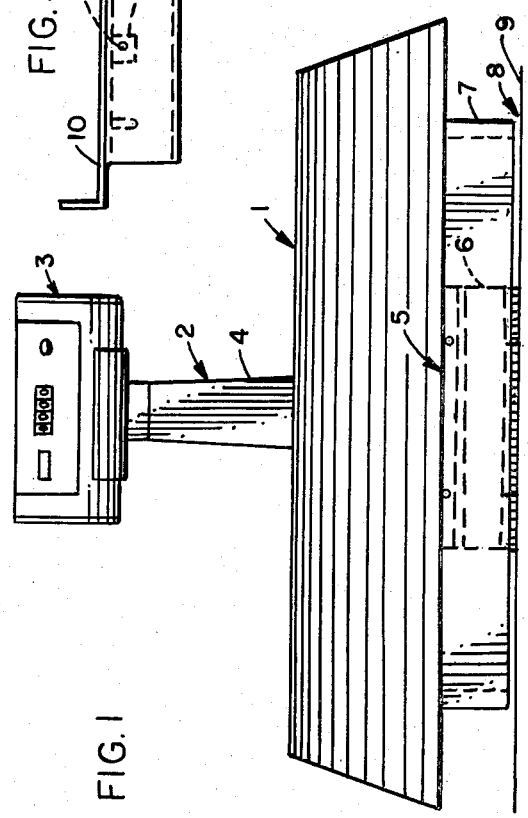

Referring to FIGS. 1, 2 and 3, the tray 1 is mounted on a conventional scale generally indicated at 2 which can be a mechanically activated type scale or an electronic type scale such as shown in U.S. Pat. No. 4,008,776, the disclosure of which is incorporated herein by reference. Regardless of whether the scale is mechanically or electronically operated, it normally has a readout mechanism 3 which shows the weight of an object to be weighed. The readout mechanism is connected either mechanically or electronically through a column 4 to a weighing platform 5 on which the tray 1 rests, the weighing platform in turn being mounted on the weighing mechanism, not shown, which is conventional and is housed in a housing 6. A skirt 7 depends from the bottom of the tray 1 and terminates at a point 8 which is a fraction of an inch from the flat, horizontal surface 9 on which the scale rests.

Figure 4:
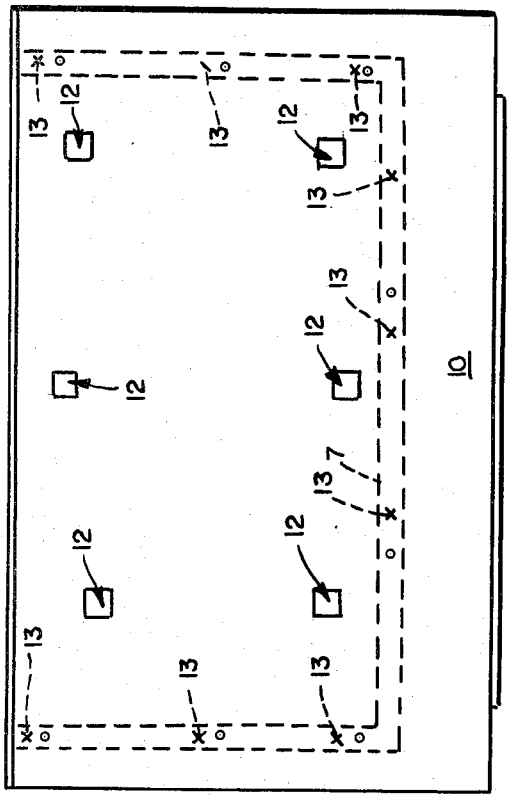
FIG. 4 is a plan view showing more specifically the structure of a support plate for the tray employed in combination with the scale as shown in FIGS. 1, 2 and 3.

The skirt 7 can be secured to the bottom of the tray 1 in various ways but is preferably welded or otherwise affixed to a support plate 10 as shown in FIG. 4 which is preferably made of metal or other suitable rigid material. A preferred type of structure is illustrated in FIG. 3 wherein the support plate 10 has cut out projections 11 which extend downwardly and are adapted to substantially coincide with the sides of the weighing platform.

Figure 5:
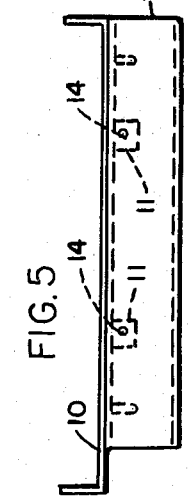
FIG. 5 is a side view showing the manner in which the support plate is attached to the skirt and weighing platform.

The openings 12 which are produced in making cutout projections 11 in the support plate 10 are illustrated in FIG. 4. The skirt 7 can be welded or otherwise secured to support plate 10 at various locations as indicated at 13 in FIG. 4. If desired, the cutout projections can be secured by means of screws 14 or other suitable means to the weighing platform 5 as illustrated in FIG. 5. Removal of the screws permits detachment of the tray for cleaning purposes or to permit the scale to be used for other purposes where a tray is unnecessary.

The tray 1 may be made of metal or a shaped, rigid plastic material, or any other suitable material having the necessary rigidity. According to a preferred mode contemplated for the practice of the invention the support plate and skirt are made of steel and the upper part of the tray which receives the article to be weighed is made of a thermo-formed plastic material or particle board covered with a plastic laminate. The invention does not lie in the particular materials employed and other materials can also be used.

In conventional scales heretofore in use for weighing babies the trays have been too small to weigh babies at times especially in the out-patient clinics in hospitals. Since a larger tray must sit on the same platform size of the scale, stability due to off-center loading is a problem.

The present invention by adding a skirt below the tray which extends along the major portion of the length and sides of the tray and is in close proximity on the table top on which the scale sits provides an improved tray and scale that will not tip if a baby is placed off-center on the tray. In addition the appearance is improved since it hides the base and platform of the scale.

In the structure illustrated the weighing platform is generally rectangular and the tray is structured to be received by a rectangular weighing platform. However, the support plate 10 can be structured to be mounted on other shapes of weighing platforms.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In a weighing scale having a weighing platform, support for said platform adapted to rest on a flat, horizontal surface, weighing mechanism responsive to the weight of an object placed on said platform, means for indicating weight in response to actuation of said weighing mechanism, and a tray to receive an object to be weighed, the improvement comprising an elongated tray to receive an object to be weighed, said tray having a bottom portion which is substantially flat and is mounted on said weighing platform with elongated bottom and sides extending outwardly from said weighing platform in opposite directions, said tray having a skirt on the bottom thereof extending at least partially around a major portion of the weighing platform and terminating a fraction of an inch from said flat horizontal surface on which said scale rests, whereby tipping and spilling of the object is avoided when an elongated object is placed in said tray to be weighed.

2. A weighing scale as claimed in claim 1 in which said skirt surrounds two opposing sides and the outer end of said weighing platform.

3. A weighing scale as claimed in claim 1 in which said skirt has three connecting straight sides and one open side.

4. A weighing scale as claimed in claim 1 in which said tray is provided with means to hold it in place on said weighing platform while permitting detachment.

5. A weighing scale as claimed in claim 1 in which said tray is provided with a support plate which extends across the bottom outer surface of said tray and has holding means for holding said support plate and said tray in position on said weighing platform.

6. A weighing scale as claimed in claim 5 in which said holding means comprises projecting portions cut out from said support plate and arranged to coincide vertically with vertical outer surfaces of said weighing platform.

7. A weighing scale as claimed in claim 1 in which said skirt is connected to a support plate which extends across the bottom outer surface of said tray.

8. A tray to receive an object to be weighed on a flat, horizontal surface of a weighing platform of a weighing scale, said tray having a bottom portion which is substantially flat and is adapted to be mounted on said weighing platform, and elongated bottom and sides extending outwardly and having a downwardly depending skirt at least partially around a major portion of the weighing platform terminating a fraction of an inch from said flat horizontal surface when said tray is mounted on said weighing platform whereby tipping and spilling of the object to be weighed is avoided.

9. A tray as claimed in claim 8 in which said skirt has three connecting straight sides and one open side so arranged that when the tray is mounted on the horizontal surface of a weighing platform of a weighing scale the three connecting straight sides surround two opposing sides and the outer end of said weighing platform.

10. A tray as claimed in claim 8 which is provided with holding means to hold it in place on said weighing platform while permitting detachment therefrom.

11. A tray as claimed in claim 10 in which said tray has a support plate which extends across the bottom outer surface of said tray and said holding means holds said support plate and said tray in position when said tray is mounted on said weighing platform.

12. A tray as claimed in claim 11 in which said holding means comprises projecting portions cut out from said support plate and arranged to coincide vertically with vertical outer surfaces of said weighing platform.

* * * * *